No. 807,875. PATENTED DEC. 19, 1905.
W. SHINNERS.
BAIT RECEPTACLE.
APPLICATION FILED JULY 26, 1905.

WITNESSES:
O. R. Erwin
N. Steinhart

INVENTOR
William Shinners
BY
Erwin & Wheeler
ATTORNEYS.

UNITED STATES PATENT OFFICE.

WILLIAM SHINNERS, OF HARTFORD, WISCONSIN.

BAIT-RECEPTACLE.

No. 807,875.     Specification of Letters Patent.     Patented Dec. 19, 1905.

Application filed July 26, 1905. Serial No. 271,279.

*To all whom it may concern:*

Be it known that I, WILLIAM SHINNERS, a citizen of the United States, residing at Hartford, county of Washington, and State of Wisconsin, have invented new and useful Improvements in Bait-Receptacles, of which the following is a specification.

My invention relates to improvements in bait-receptacles.

The object of my invention is to provide a suitable receptacle for minnows or other small fish used for bait which is adapted to be attached by flexible connection with the rear of the fisherman's boat and to float partially submerged in the water.

The construction of my invention is explained by reference to the accompanying drawings, in which—

Figure 1:
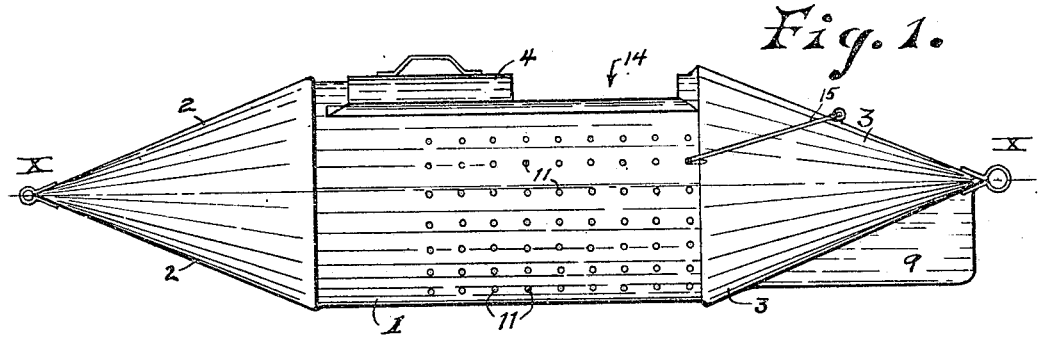
Figure 2:
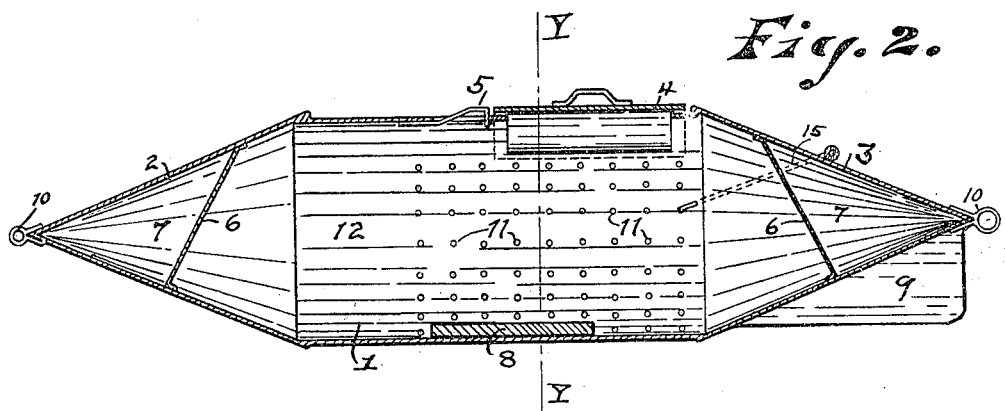
Figure 3:
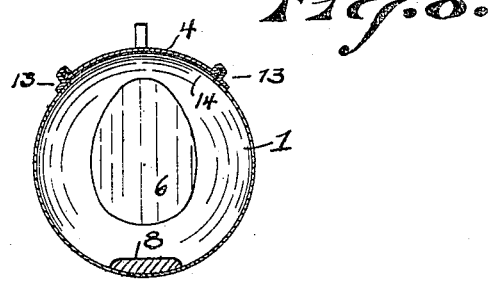

Figure 1 represents a side view showing the door of the receptacle in its open position. Fig. 2 represents a longitudinal vertical section thereof drawn on line $x\ x$ of Fig. 1, and Fig. 3 represents a transverse section drawn on line $y\ y$ of Fig. 2.

Like parts are identified by the same reference characters throughout the several views.

My bait-receptacle comprises the cylindrical central portion 1, conical front portion 2, conical rear portion 3, sliding door 4, door-retaining latch 5, diagonal partitions 6 6, forming air-chambers 7 7, ballast 8, keel-board 9, and fastening-rings 10. The cylindrical central portion 1 is provided with a plurality of apertures 11 11. The greater number of the apertures 11 are preferably formed at the rear side of the vertical center of the receptacle 1, whereby a dead-water space 12 is formed near the front end of the receptacle, so that the water when at the front of the receptacle when the same is moving rapidly will remain substantially at rest. It will of course be understood that the perforations 11 are provided for a free circulation of the water through the tank.

To provide for retaining the receptacle in its proper vertical position, with the door 4 at the top, as indicated in Figs. 1 and 2, air-chambers 7 7 are formed, having their largest area on the upper side of the conical ends, which have a tendency to maintain the receptacle in its proper vertical position and prevent it from rolling, as it might otherwise do. I also preferably provide the receptacle with a ballast-block 8, which coöperates with the air-chambers 7 to maintain the receptacle in its proper position in the water and prevent it from rolling.

13 13 are door-retaining flanges which are respectively secured to the walls of the receptacle on the respective sides of the doorway 4 and serve to retain the door 4 in place therein, while they permit said door to be slid forwardly and backwardly therein when desired to open and close the same.

5 is a retaining-catch by which the door is locked in its closed position. The catch 5 is made of resilient wire and is adapted to be forced inwardly beneath the door, whereby the door will freely pass over the latch when desirous to open the same.

The keel-plate 9 serves to prevent the swaying or rolling movement of the receptacle as it is being drawn through the water.

It is obvious that owing to the conical shape of the front end of the receptacle, diverging, as it does, outwardly from a common center to its periphery, it is adapted to be drawn through weeds without becoming entangled therewith and with the slightest possible resistance from weeds or the surrounding water, while, owing to the action of the ballast and the peculiar shape of the air-chambers therein, it is adapted to remain in its proper upright position in the water both when in motion and when at rest.

15 is a bail by which the receptacle is carried when removed from the water. The bail 15 is attached to the rear end of the receptacle, whereby when the receptacle is suspended from the bail the water and the minnows or other bait therein will remain in the unperforated end of the cylinder, when it is obvious that, owing to the fact that the perforations extend from the rear end but slightly past the center of the receptacle, the water in the receptacle will be prevented from escaping through said perforations and a sufficient body of water will be retained to preserve the fish when the receptacle is removed from the water. Thus it will be obvious that by leaving the front end of the receptacle unperforated it performs a twofold function, serving as a dead-water space for the bait as the receptacle is being rapidly drawn through the water and also to retain a body of water in which to preserve the bait when the receptacle is removed from the water.

Having thus described my invention, what I claim as new, and desire to secure by Letters Patent, is—

1. A bait-receptacle comprising a central portion having perforated walls; and conical ends provided with air-chambers; the largest portion of which is located above the longitudinal center of the receptacle.

2. A bait-receptacle comprising a cylindrical central portion having perforated walls; conical ends; and a ballast-bar located at the lower extremity of the central portion.

3. A bait-receptacle comprising a cylindrical central portion having perforated walls; conical ends provided with air-chambers; the largest area of which is located above the longitudinal center of the receptacle; and a ballast-bar located at the lowest extremity of the central portion, substantially as set forth.

4. A bait-receptacle comprising a cylindrical central portion having perforated walls; conical ends provided with air-chambers, the largest area of which is located above the longitudinal center of the receptacle; and a vertical keel-plate attached to one of said ends.

5. A bait-receptacle comprising a cylindrical central portion having perforated walls; conical ends provided with air-chambers having their largest area located above the longitudinal center of said receptacle; a ballast-bar located at the lower side of said receptacle; a keel-plate connected with one of said conical ends; a doorway formed through the upper side of said receptacle; and a door for closing said doorway, all substantially as and for the purpose specified.

6. A bait-receptacle comprisng a cylindrical central portion, the walls of which are perforated near its rear end, and unperforated near its front end; a bail for carrying said receptacle when removed from the water connected with its rear end, whereby, when said receptacle is removed from the water and suspended from said bail, it will retain the body of water at its lower unperforated end for preserving the bait therein, substantially as set forth.

In testimony whereof I affix my signature in the presence of two witnesses.

WILLIAM SHINNERS.

Witnesses:
JAS. B. ERWIN,
W. STEINHART.